United States Patent
Esposito De La Torella

(10) Patent No.: US 9,755,424 B2
(45) Date of Patent: Sep. 5, 2017

(54) MULTISPUR FIELDBUS ISOLATOR ARRANGEMENT

(71) Applicant: Frederic Esposito De La Torella, Luton (GB)

(72) Inventor: Frederic Esposito De La Torella, Luton (GB)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/636,279

(22) Filed: Mar. 3, 2015

(65) Prior Publication Data

US 2015/0180226 A1 Jun. 25, 2015

Related U.S. Application Data

(63) Continuation of application No. 13/062,004, filed as application No. PCT/GB2009/051106 on Sep. 2, 2009, now abandoned.

(30) Foreign Application Priority Data

Sep. 4, 2008 (GB) .................................. 0816121.8

(51) Int. Cl.
  *H02H 3/00* (2006.01)
  *H02H 9/00* (2006.01)
  *H01R 13/53* (2006.01)
  *H01R 12/70* (2011.01)
  *H02H 7/22* (2006.01)
  *H02H 9/04* (2006.01)

(52) U.S. Cl.
  CPC ......... *H02H 9/008* (2013.01); *H01R 12/7076* (2013.01); *H01R 13/53* (2013.01); *H02H 7/22* (2013.01); *H02H 9/04* (2013.01)

(58) Field of Classification Search
  CPC .......... H02G 3/088; H02H 9/008; H02H 9/04; H02K 5/136; G05B 2219/24028; G05B 2219/31121; G05B 2219/31135; G05B 2219/14011; H01R 13/527
  USPC ......................................... 361/1, 62, 67, 824
  See application file for complete search history.

(56) References Cited

U.S. PATENT DOCUMENTS 8,797,830 B2    8/2014  Baliga et al.
2005/0024160 A1*  2/2005  Vazach .............. G05B 19/0423
                                                          333/81 R (Continued)

FOREIGN PATENT DOCUMENTS

DE          19907846 C1       9/2000

OTHER PUBLICATIONS

Langbroek, Arjen; Patent Cooperation Treaty PCT International Search Report mailed Nov. 20, 2009 in PCT application No. PCT/GB2009/051106; pp. 1-5.

*Primary Examiner* — James Wu
(74) *Attorney, Agent, or Firm* — King & Spalding LLP

(57) ABSTRACT

The present invention provides for a multispur fieldbus isolator arrangement having a trunk (23) and in which each of a number of spur outlets (210) is connected to the trunk (23) by coupler isolators (24), where each coupler isolator (24) includes a removably mounted modular unit arranged for plug-in connection to the trunk (23) by means of a flameproof connection (29), and where a redundant coupler isolator can likewise be included for activation responsive to failure of a coupler isolator.

20 Claims, 4 Drawing Sheets

(56) References Cited

U.S. PATENT DOCUMENTS

2007/0223180 A1* 9/2007 Becker .................. H02H 9/008
361/679.41
2009/0215324 A1* 8/2009 Rogoll ............... G05B 19/0423
439/717

* cited by examiner

MULTISPUR FIELDBUS ISOLATOR ARRANGEMENT

The present invention relates to a fieldbus isolated coupler, better known as a multispur fieldbus isolator or a fieldbus isolator, forming part of an Intrinsically Safe (IS) system for supplying power and/or signals into hazardous areas, and in particular to a multispur fieldbus isolator arrangement for supply of power and/or signals to a variety of different devices within an IS environment. In addition to the provision of simple fieldbus isolator devices for use in supplying an IS field device operating within a hazardous area, multispur fieldbus isolator arrangements are known having a trunk connection means for the connection of a trunk connection bus, and offering a plurality of spur outlets through which any appropriate number and variety of remote field devices can be supplied and/or addressed.

In such known systems, a variety of fieldbus isolator devices (also called fieldbus isolator units and fieldbus isolator device units) are provided, commonly with each one providing isolator protection for a plurality of spur outlets.

However, such known systems and arrangements prove disadvantageous and limiting with respect to matters of cost and ease of use and particularly where the multispur arrangement itself might have to be located within a potentially hazardous environment. In particular, such devices require extensive wiring connections which can lead to unnecessary size and complexity and labour-cost issues and the number, type, and general size of the enclosures required can also prove problematic and limiting. Should any changes/repairs to the system be required, it becomes necessary to power-down the fieldbus trunk. Also, surge limiter replacement carries the risk of adjacent-channel shorts and can require, depending on the specific characteristics of the particular environment, gas clearance for full power disconnection.

The present invention seeks to provide for a multispur fieldbus isolator arrangement having advantages over known such arrangements.

According to a first aspect of the present invention there is provided a multispur fieldbus isolator arrangement having trunk connection means and in which each of a plurality of spurs is connected to the trunk by isolators and with surge protector devices, wherein each isolator device comprises a removably mounted modular unit arranged for plug-in connection to the trunk by means of a flameproof connection so as to provide for a non-hazardous connection.

The provision of the isolator device in the form of a removably mounted modular unit assists greatly in reducing the wiring, and overall size of the arrangement and, in particular, use of the aforementioned flameproof connectors in connecting to the trunk allows for the advantageous use of a multispur arrangement within a potentially hazardous environment.

Advantageously, the trunk connection, modular isolator devices and surge protectors are disposed to be mounted onto the support means of the system.

In particular, since the support means can comprise a back plane, advantageously, the surge protectors can be removably mounted within the arrangement and without requiring neither removal of power from the trunk nor removal of power to the spur on which the surge protector is mounted.

In accordance with one aspect of the invention, the multispur arrangement can include redundant modular isolator device units arranged for interconnection to spur outlets associated with a failed unit.

In particular, the redundant modular isolator device can be arranged for interconnection to such spur outlets of the failed unit in a manner responsive to an indication of failure of the failed unit.

The invention can further provide control means for configuring the connection of the redundant modular isolator device units to the spur outlets.

In particular, each modular isolator device can be arranged to provide protection for a plurality of spur outlets.

Yet further, removably mounted trunk surge protector devices and/or removably mounted terminator devices can be provided and including flameproof connectors.

According to another aspect of the present invention there is provided a fieldbus isolator device arranged to be removably mounted in a multispur fieldbus isolator system and between a trunk connector and spur outlets, and comprising flameproof connector means for connection to the said trunk of the system.

Advantageously, the flameproof connector means comprise plug-connectors arranged for the removable mounting of the fieldbus isolator device.

Further, the fieldbus isolator device can include plug connector means for connection with surge protectors of the multispur fieldbus isolator system.

Yet further, the fieldbus isolator device can be arranged to be mounted by said flameproof connectors to support means of the multispur fieldbus isolator system which can comprise a back plane.

It should be appreciated therefore that the fieldbus isolator device can comprise a modular readily removable plug-in device.

The present invention can therefore advantageously allow for an effective "plug and play" solution to the provision of an appropriate number of fieldbus isolator devices within a multispur fieldbus isolator arrangement and which can readily provide for redundancy within the arrangement. The modular plug-in fieldbus isolator devices can be easily and quickly mounted as required and so maintenance of the device, and likewise the overall system arrangement, is likewise enhanced.

The whole system can therefore be readily tested, and appropriate adjustments and/or replacements made as required, before full installation.

As regards the location of the multispur unit within hazardous areas, it is considered that it can be readily mounted within a Zone 1 environment whilst still allowing for live disconnection/reconnection. Also, when compared with the current art, the overall volume of the enclosure, and indeed the number of enclosures required, is vastly reduced having advantageous cost implications.

Through the lack of manual input in building the system, and in particular removing the need for extensive wiring, the overall system is found to be more reliable and any required replacement of a isolator device can be achieved without disconnecting power or requiring gas clearance. Likewise, any spur surge protector insertion/replacement/removal, and/or any trunk surge protector insertion/replacement/removal, and/or any terminator insertion/replacement/removal, can be achieved while the system remains working.

The invention is described further hereinafter, by way of example only, with reference to the accompanying drawings in which.

Figure 1:
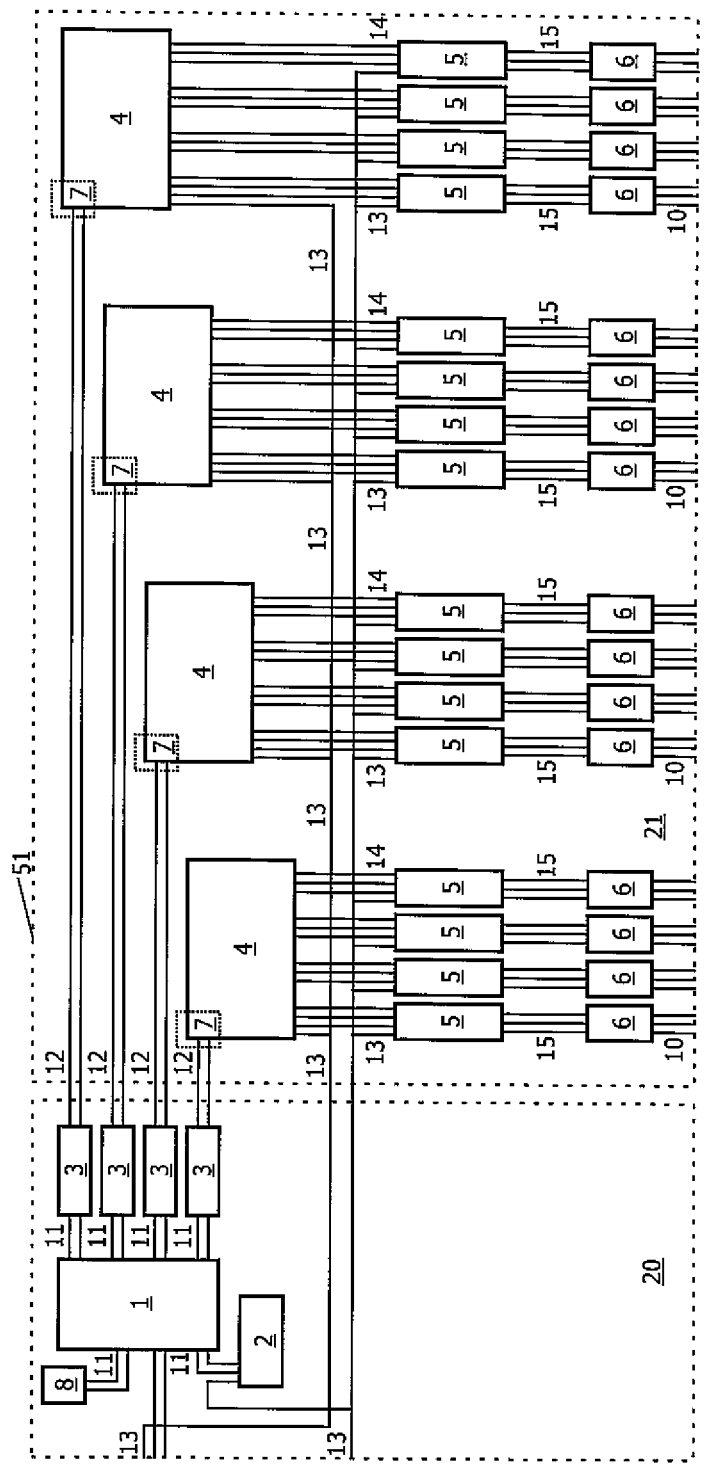
FIG. 1 is a plan view of a conventional multispur fieldbus isolator arrangement.

Turning first to FIG. 1, there is provided a plan view of a typical conventional sixteen spur fieldbus isolator system arranged for connection to an input trunk, and for provision of output signals on sixteen spurs.

As will be appreciated from the discussion below, the sixteen spurs are divided into groups of four, each of which is provided with a signal from a four-spur isolator.

As illustrated in FIG. 1, there is provided an Ex e terminal block 1 and associated trunk surge protector 2, and Ex de safety flameproof switches 3 each of which feeds to a respective one of the four-spur isolators 4 which in turn have outputs connected to four spur outlets which are also fed by way of respective surge protectors 5 and terminal blocks 6.

Each of the four-spur isolators 4 is associated with a security cover 51 serving to prevent access to, and removal of, the connection without deactivating the flameproof switches 3. Also provided connected to the terminal block 1 is a terminator unit 8.

The actual external wiring to the spurs for the remote devices 10 leads from the respective terminal blocks 6. Also internal wiring and trunking 11 is provided for connection between external wiring 13 to the trunk and the terminal block 1 and wiring 11 is likewise provided for connection between the terminal block 1 and the safety flameproof switches 3. Further internal wiring 12 is provided for feeding from the flameproof switches 3 to the isolators 4 and internal wiring 14, 15 provides for connection between the barriers 4 and the terminal blocks 6 and also the surge protectors 5 and the terminal blocks 6. Also, each of the surge protectors 5 is fed directly by the external wiring 13 as illustrated.

As will be appreciated, the terminator units 8, trunk surge protector 2, flameproof switches 3 and associated wiring connections 11 as illustrated are provided within a separate enclosure 20.

The remainder of the system comprising the four-spur isolators 4 and associated surge protectors 5 and terminal blocks 6, and of course the associated internal wiring and elements of the external wiring 13 and internal wiring 12 as illustrated, is provided within a separate main enclosure 21.

As discussed previously, a variety of disadvantages arise in relation to such known systems not least of which is that removal of the various devices, and in particular the four-spur isolators 4 requires gas clearance and/or a power-down. Also, the use of the multiple flameproof switches 3 is found to be expensive and bulky.

In particular, the extensive internal wiring and trunking 12, 13, 14, 15 (as illustrated) disadvantageously necessitates the employment of wire, cable, two-ferrules per wire, and associated heat shrinking, trunking support, rows of terminal blocks, din rails and din rail supports which all serve to exaggerate the complexity and size of known arrangements. High labour costs are experienced in fitting the various mechanical parts of the system, in particular the din rails, and for stripping the wires, crimping the ferrules, heat shrinking the cable protectors that are all associated with the extensive wiring as illustrated in FIG. 1.

Any required changes cannot all be achieved on a live basis and the fieldbus has to be powered-down, which will effectively stop the plant in which the hazardous environment is found. Any required replacement of the surge protectors 5 will require disconnection of the spur and create a risk of adjacent-channel shorts. Further, any required replacement of the trunk surge protector 2 will require either gas clearance or disconnection of the power.

Also, it is a necessity that the intermediate Ex e trunk connections 7 are changed by different personnel as compared with the remainder of the wiring and this leads to additional cost, and complexity and possibly down-time for the system.

Also, there is no scope for the provision of redundancy within the arrangement illustrated in FIG. 1.

Figure 2A:
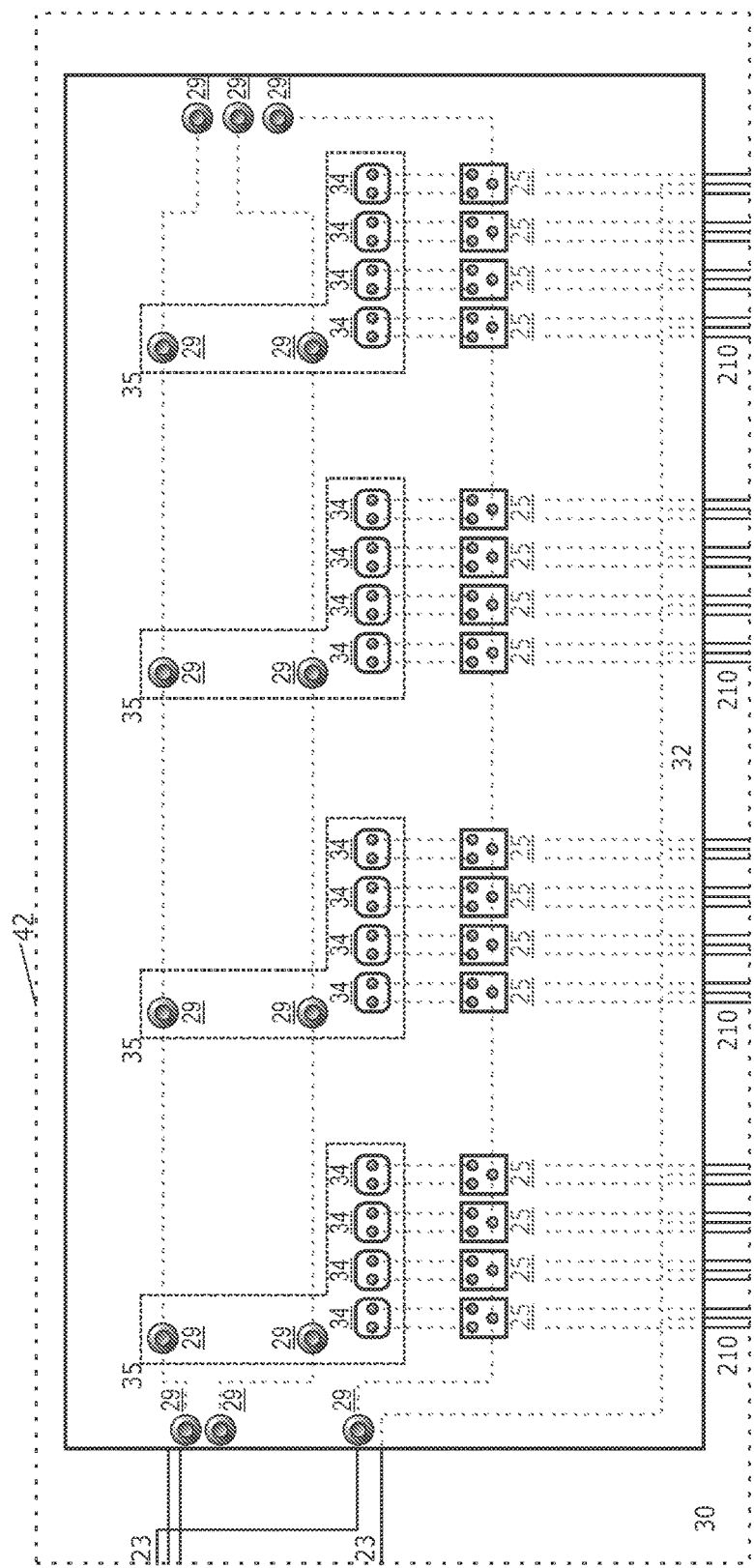
FIGS. 2A and 2B show a block diagram offering the same functionality as that of FIG. 1 but illustrating the multispur fieldbus arrangement according to an embodiment of the present invention.
Figure 2B:
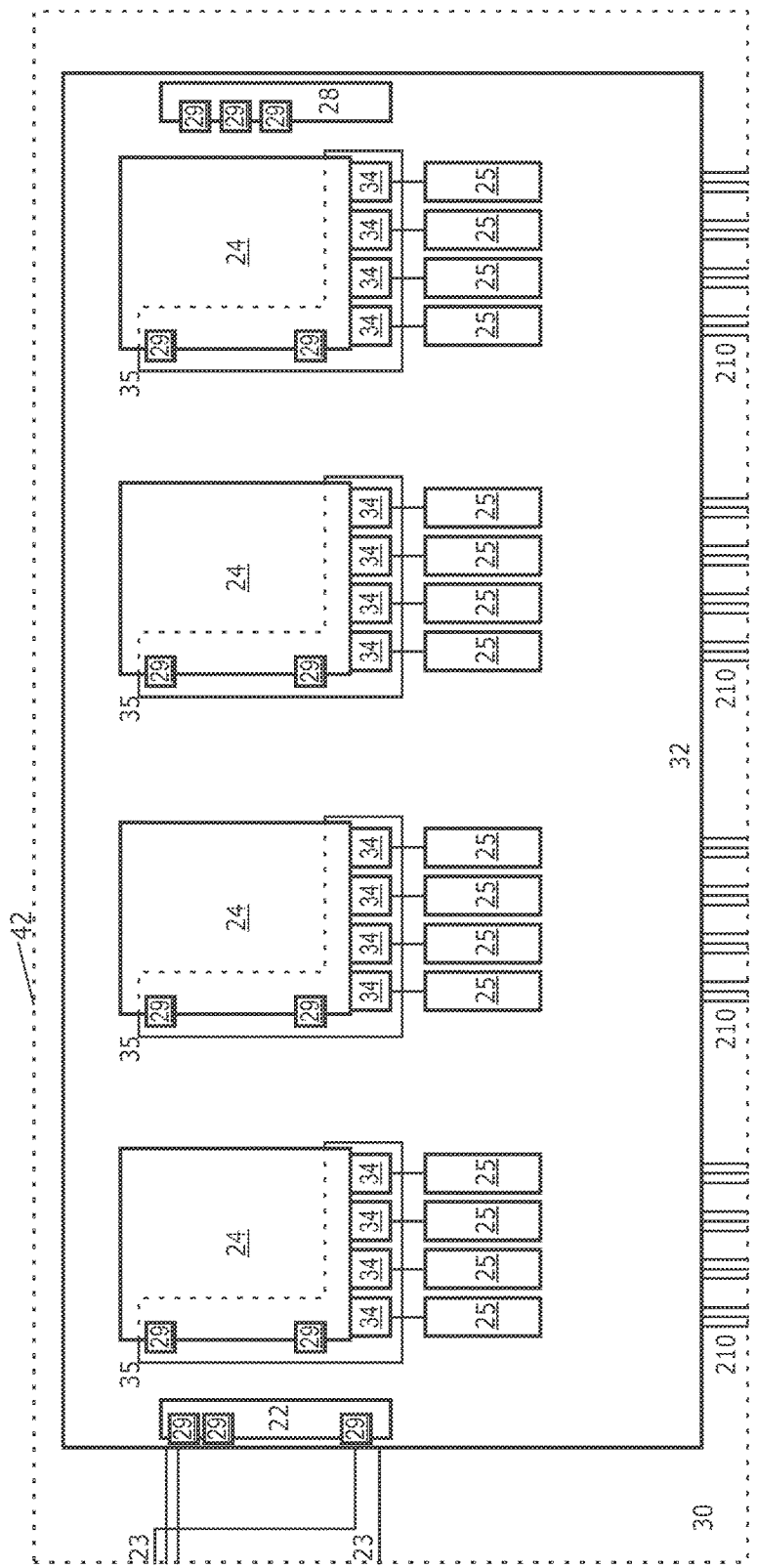

Turning now to FIGS. 2A and 2B, there is provided a schematic block diagram of a multispur fieldbus isolator system according to an embodiment of the present invention. Specifically, FIG. 2A shows a schematic block diagram of the fieldbus isolator system without the coupler isolators 24, and FIG. 2B shows a schematic block diagram of the fieldbus isolator system with the coupler isolators 24 coupled to a number of the flameproof connectors 29 and the intrinsically safe spur connectors 34.

Again, a trunk surge protector 22 is provided along with four coupler isolators 24, each associated with four spur surge protectors 25 from which extends external wiring of spur outlets 210 to the remote located field devices on each of the sixteen spurs. A trunk terminator 28 is provided, and external wiring from the trunk arrives within the system, by way of the trunk surge protector 22.

The complete system in this example is provided within a single enclosure 30, and each of the trunk surge protector 22, the four coupler isolators 24, spur surge protectors 25 and trunk terminator 28 are removably mounted by way of plug-in connectors to a backplane 32, which can be a carrier 42 for the whole system. For example, as shown in FIGS. 2A and 2B, a one or more connector assemblies 35 can be mounted on the backplane 32 and couple to one or more coupler isolators 24. In such a case, each connector assembly 35 can include one or more flameproof connectors 29 permanently connected to the trunk 23 and detachably coupled to a coupler isolator 24, and one or more plug-in spur connectors 34 permanently connected to one or more spur surge protectors 25 and detachably coupled to the coupler isolator 24.

The backplane 32 includes the predefined electrical connection (e.g., printed wiring) between the components as illustrated and thereby removes the need for the extensive wiring found in conventional systems.

Importantly, through the use of flameproof connectors 29, i.e. connectors arranged to provide for a non-hazardous connection, for connection of each of the coupler isolators 24 with the external wiring of the trunk 23, the system itself can advantageously be located in a hazardous area as required. Such an arrangement provides a number of benefits. For example, as those of ordinary skill in the art will appreciate, since a coupler isolator 24 is coupled to one or more flameproof connectors 29 of a connector assembly, the coupler isolator 24 can be removed from (decoupled from) the flameproof connectors 29 when power is provided by the trunk to the flameproof connectors 29 without causing a source of ignition.

The trunk surge protector 22 and trunk terminator 28 can likewise be provided in a plug-in fashion by way of the flameproof connectors 29 illustrated to the backplane 32 without compromising the required level of at least "Zone 1" safety. Alternatively however, the trunk terminator 28 can be provided as an integral part of the backplane 32.

The overall size of the enclosure 30 of the embodiment of FIGS. 2A and 2B can therefore be greatly reduced as compared with that employed in conventional systems such as illustrated in FIG. 1.

Another important point of advantageous comparison between the present invention and the prior art is clear from the comparison of FIGS. 1 and 2, in particular, the respective trunks 13 thereof. Within known systems such as that illustrated in FIG. 1, the trunk 13 is, as mentioned, connected to the terminal block 1 by way of jumpers or other appropriate means, in order to provide for yet further trunks 11 which, in turn, are connected to the Ex de switches 3. The switchable trunks 12 are then, likewise in turn, connected to the isolators 4 by way of the intermediate Ex e trunk connection 7.

Such prior art systems therefore require at least duplication and in some cases triplication, or more, of the trunk 13 in order to provide appropriate connection to the multiple isolators 4.

Turning now to the present invention, and the illustrated embodiment provided by FIGS. 2A and 2B, it will be immediately apparent that only one connection to the trunk 23 is required. The provision of the trunk surge protector 22 and its flameproof connectors 29 advantageously provide for the sole interface to the trunk 23 that is required for feeding all of the coupler isolators 24 illustrated in FIGS. 2A and 2B.

Importantly, and as will be appreciated, the coupler isolators 24 and indeed the spur surge protector 25, trunk surge protector 22 and trunk terminator 28 can likewise be readily removed and replaced in a plug-in/plug-out manner whilst maintaining the required degree of safety and without requiring any down-time for the system, nor gas clearance, and without requiring only specific manual operations other than removal and replacement of the modular coupler isolators 24.

Figure 3:
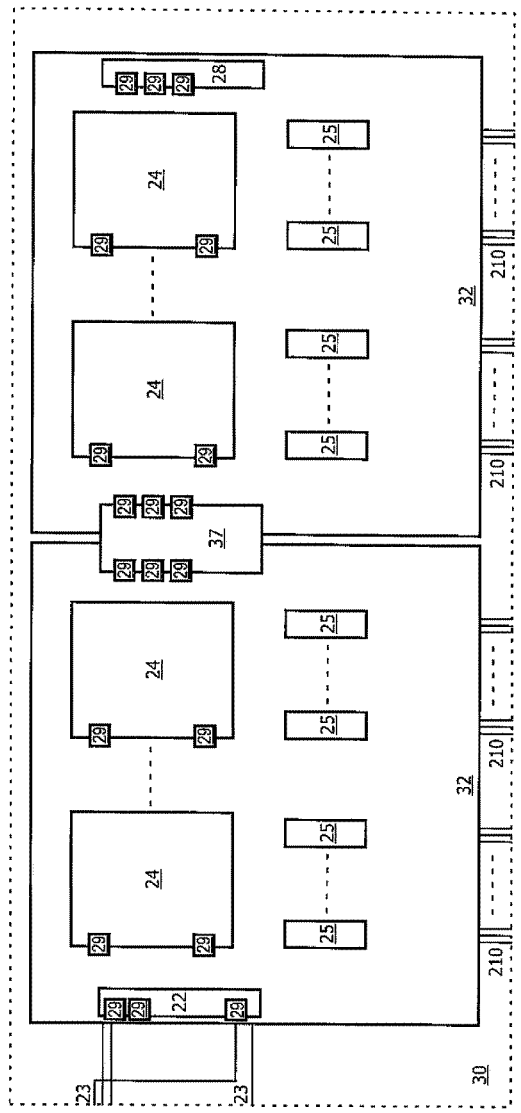
FIG. 3 is a similar block schematic diagram illustrating a multispur fieldbus arrangement according to another embodiment of the present invention.

Turning now to FIG. 3 there is provided a plan view of a further embodiment of the present invention and similar reference numerals to those found previously are employed. Here, two (or it readily could be more) separate carriers are provided each arranged for the removable mounting of two or more coupler isolators 24 and their associated spur surge protectors 25.

Connection between the backplanes 32 so as to effectively achieve a unitary backplane 32 is achieved by way of a flameproof jumper 37 which is arranged for grouping connection by way of flameproof connectors 29 engaging with sockets within the backplanes 32 and which could otherwise be occupied by a trunk terminator 28, one of which is illustrated in the right side backplane 32 of FIG. 3.

Any appropriate number of backplanes 32 can then be connected in series so as to provide for any appropriate number of spur outlets 210 from the fieldbus isolator system of the present invention.

As a further advantage of the present invention, an appropriate degree of redundancy can be introduced into the system by operation of a selection of one of the modular fieldbus coupler isolators 24 as a redundant isolator device.

Such redundancy can readily be introduced into the present invention, and as illustrated in the embodiments of FIGS. 2A, 2B, and 3, in view of the modular nature of the fieldbus coupler isolators 24 in particular. Further, controlled-connectivity can be provided between the redundant coupler isolator 24 and the spur surge protectors 25 or spur outlets 210 associated with the failed coupler isolator 24 as required.

The failed modular coupler isolator 24 can then be readily and simply unplugged without requiring power down or gas clearance for thereby simple replacement by way of a replacement isolator device.

As can be further appreciated, the surge protectors (trunk surge protector 22, spur surge protector 25) of the invention can be readily replaced without effecting the whole operation of the system, and the trunk terminator 28 can be introduced, removed or replaced as appropriate during commission of the system whilst the system is live.

The modular nature of the coupler isolators 24 allows for replacement without the requirement for disconnecting any other isolator devices, and the "plug and play" solution of the present invention greatly reduces the time that personnel need to be present on-site. Any further extension to the system, such as illustrated with reference to FIG. 3, can be performed without requiring power down or gas clearance, and the ready introduction of an appropriate degree of redundancy likewise allows for live repair relevant within the system.

In particular the invention advantageously employs the use of flameproof connectors 29 rather than screw terminals as found in conventional systems, and indeed rather than the use of flameproof switches 3 as currently known, as shown in FIG. 1.

The example backplane 32 provides a simplified and secure alternative option as compared with the large amount of wiring arising in the current systems and the use of live pluggable surge devices without disturbance of the functionality of the system provides a further advantage as does the use of the carrier board or back plane device for the redundancy functionality of the system.

It should of course be appreciated that the invention is not restricted to the details of the foregoing embodiments and that any appropriate configuration of modular fieldbus isolator devices and surge connectors, and indeed carrier boards can be provided as required and in offering an appropriate degree of Intrinsic Safety protection. Yet further, and with particular reference to FIGS. 2A and 2B, while a total of sixteen spurs is provided by way of four coupler isolators 24 other configurations are readily possible. For example a single isolator device could be provided which itself offers the sixteen output spurs, or two isolator devices could be provided each offering eight output spurs. Any configuration is possible as required.

The invention claimed is:

1. An electrical circuit comprising:
   a trunk that provides power;
   a plurality of first spur outlets that provides the power to a plurality of first electrical devices;
   at least one first flameproof connector electrically coupled to the trunk;
   a plurality of first spur connectors electrically coupled to the plurality of first spur outlets; and
   a first coupler isolator removably coupled to the at least one first flameproof connector and the plurality of first spur connectors,
   wherein the first coupler isolator is removable from the at least one first flameproof connector when the power is provided by the trunk without causing a first source of ignition.

2. The electrical circuit of claim 1, wherein the plurality of first spur outlets, the at least one first flameproof connector, and the plurality of first spur connectors are disposed on a backplane.

3. The electrical circuit of claim 2, wherein the backplane is disposed within an electrical enclosure.

4. The electrical circuit of claim 2, wherein the backplane is disposed on a carrier.

5. The electrical circuit of claim 1, further comprising:
a plurality of first surge protectors electrically disposed between the plurality of first spur connectors and the plurality of first spur outlets.

6. The electrical circuit of claim 1, further comprising:
at least one second flameproof connector electrically disposed between the trunk and the at least one first flameproof connector; and
a trunk surge protector removably coupled to the at least one second flameproof connector, wherein the trunk surge protector is removable from the at least one second flameproof connector when the power is provided by the trunk without causing a second source of ignition.

7. The electrical circuit of claim 1, further comprising:
at least one second flameproof connector electrically coupled to the at least one first flameproof connector; and
a trunk terminator removably coupled to the at least one second flameproof connector, wherein the trunk terminator is removable from the at least one second flameproof connector when the power is provided by the trunk without causing a second source of ignition.

8. The electrical circuit of claim 1, further comprising:
a plurality of second spur outlets that provides the power to a plurality of second electrical devices;
at least one second flameproof connector electrically coupled to the trunk;
a plurality of second spur connectors electrically coupled to the plurality of second spur outlets; and
a second coupler isolator removably coupled to the at least one second flameproof connector and the plurality of second spur connectors,
wherein the second coupler isolator is removable from the at least one second flameproof connector when the power is provided by the trunk without causing a second source of ignition.

9. The electrical circuit of claim 8, wherein the at least one second flameproof connector is further electrically coupled to the at least one first flameproof connector, wherein the plurality of second electrical devices receives the power via the plurality of first spur connectors when an open circuit is created between the at least one second flameproof connector and the plurality of second spur connectors, and when the first coupler isolator is coupled to the at least one first flameproof connector.

10. The electrical circuit of claim 1, wherein decoupling the first coupler isolator from the at least one first flameproof connector and the plurality of first spur connectors when the power is provided by the trunk further prevents a surge from traveling to the plurality of first electrical devices.

11. An electrical circuit comprising:
a trunk that provides power;
a plurality of first spur outlets that provides the power to a plurality of first electrical devices;
at least one first flameproof connector electrically coupled to the trunk;
a plurality of first spur connectors electrically coupled to the plurality of first spur outlets;
a first coupler isolator coupled to the plurality of first spur connectors; and
a trunk surge protector removably coupled to the at least one first flameproof connector and the first coupler isolator,
wherein the trunk surge protector is removable from the at least one first flameproof connector when the power is provided by the trunk without causing a first source of ignition.

12. The electrical circuit of claim 11, wherein coupling the trunk surge protector from the at least one first flameproof connector when the power is provided by the trunk further prevents a surge from traveling to the plurality of first electrical devices.

13. The electrical circuit of claim 11, wherein first coupler isolator is removably coupled to at least one second flameproof connector, wherein the first coupler isolator is removable from the at least one second flameproof connector when the power is provided by the trunk without causing a second source of ignition.

14. The electrical circuit of claim 13, further comprising:
at least one third flameproof connector electrically coupled to the at least one second flameproof connector; and
a second coupler isolator removably coupled to the at least one third flameproof connector, wherein the second coupler isolator is removable from the at least one third flameproof connector when the power is provided by the trunk without causing a third source of ignition.

15. The electrical circuit of claim 11, further comprising:
at least one second flameproof connector electrically coupled to the at least one first flameproof connector; and
a trunk terminator removably coupled to the at least one second flameproof connector, wherein the trunk terminator is removable from the at least one second flameproof connector when the power is provided by the trunk without causing a second source of ignition.

16. An electrical circuit comprising:
a trunk that provides power;
a plurality of first spur outlets that provides the power to a plurality of first electrical devices;
a plurality of second spur outlets that provides the power to a plurality of second electrical devices;
a first coupler isolator coupled to the trunk and the plurality of first spur outlets; and
a second coupler isolator coupled to the trunk and the plurality of second spur outlets,
wherein the plurality of second electrical devices receives the power via the first coupler isolator when at least a first portion of the second coupler isolator becomes inactive, and
wherein the plurality of first electrical devices receives the power via the second coupler isolator when at least a second portion of the first coupler isolator becomes inactive.

17. The electrical circuit of claim 16, further comprising:
at least one first flameproof connector electrically coupled to the trunk; and
a plurality of first spur connectors electrically coupled to the plurality of first spur outlets, wherein the first coupler isolator is removably coupled to the at least one first flameproof connector and the plurality of first spur connectors, wherein the first coupler isolator is removable from the at least one first flameproof connector when the power is provided by the trunk without causing a first source of ignition.

18. The electrical circuit of claim 17, further comprising:
at least one second flameproof connector electrically coupled to the trunk; and
a plurality of second spur connectors electrically coupled to the plurality of second spur outlets, wherein the second coupler isolator is removably coupled to the at least one second flameproof connector and the plurality of second spur connectors, wherein the second coupler isolator is removable from the at least one second flameproof connector when the power is provided by the trunk without causing a second source of ignition.

19. The electrical circuit of claim 16, further comprising:
at least one first flameproof connector electrically coupled to the trunk, the first coupler isolator, and the second coupler isolator; and
a trunk surge protector removably coupled to the at least one first flameproof connector, wherein the trunk surge protector is removable from the at least one first flameproof connector when the power is provided by the trunk without causing a first source of ignition.

20. The electrical circuit of claim 16, further comprising:
at least one first flameproof connector electrically coupled to the first coupler isolator and the second coupler isolator; and
a trunk terminator removably coupled to the at least one first flameproof connector, wherein the trunk terminator is removable from the at least one first flameproof connector when the power is provided by the trunk without causing a first source of ignition.

\* \* \* \* \*